Figure 1:
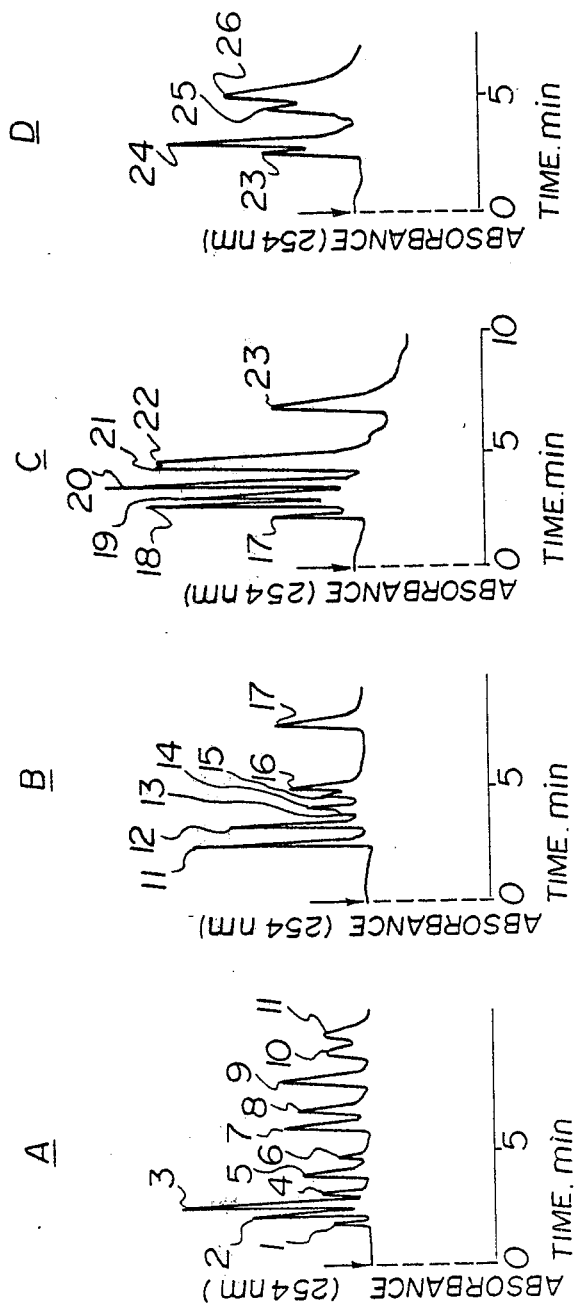

United States Patent [19]

Chmielowiec

[11] 4,329,254

[45] May 11, 1982

[54] MERCURO-ORGANIC BONDED PHASE SORBENTS

[76] Inventor: Jan Chmielowiec, 1030 King St. #13, Ottawa, Ontario, Canada, K1Z 6K9

[21] Appl. No.: 167,028

[22] Filed: Jul. 9, 1980

[30] Foreign Application Priority Data

Feb. 29, 1980 [CA] Canada ................................. 346787

[51] Int. Cl.$^3$ ........................ B01D 15/08; C07C 7/12
[52] U.S. Cl. .................................. 252/430; 252/428; 210/656; 585/825
[58] Field of Search ................... 252/428, 430, 431 R, 252/431 C, 431 N, 431 P

[56] References Cited

U.S. PATENT DOCUMENTS

| | | | |
|---|---|---|---|
| 2,075,971 | 4/1937 | Bake | 260/13 |
| 2,330,452 | 9/1943 | Schiller | 260/431 |
| 2,389,647 | 11/1945 | Soday | 260/680 |
| 2,441,572 | 5/1948 | Hirschler et al. | 196/147 |
| 2,502,222 | 3/1950 | Kaplan et al. | 260/434 |
| 2,614,135 | 10/1952 | Hirschler | 260/674 |
| 2,632,778 | 3/1953 | Jonach | 260/666 |
| 2,722,504 | 11/1955 | Fleck | 196/52 |
| 2,905,704 | 9/1959 | Hirschler | 260/452 |
| 2,941,018 | 6/1960 | Foreman | 260/674 |
| 3,070,639 | 12/1962 | Geerts et al. | 260/674 |
| 3,080,349 | 3/1963 | Clarke et al. | 260/88.2 |
| 3,219,717 | 11/1965 | Niles | 260/666 |
| 3,401,186 | 9/1968 | Muller et al. | 260/430 |
| 3,655,707 | 4/1972 | Josephson | 260/433 |
| 3,658,696 | 4/1972 | Shively et al. | 208/310 |
| 3,664,967 | 5/1972 | Stehl | 252/431 R |
| 3,698,157 | 10/1972 | Allen et al. | 55/67 |
| 3,725,302 | 4/1973 | Shimely et al. | 252/431 R |
| 3,839,385 | 10/1974 | Meiller et al. | 252/430 X |
| 3,944,501 | 3/1976 | Whitehurst et al. | 252/430 X |
| 3,956,179 | 5/1976 | Sebestian et al. | 252/430 |
| 3,984,349 | 10/1976 | Meiller et al. | 252/428 |
| 4,034,139 | 7/1977 | Mazarguil et al. | 252/431 R X |
| 4,083,803 | 4/1978 | Oswald et al. | 252/430 |
| 4,111,838 | 9/1978 | Schaeffer et al. | 252/430 |

FOREIGN PATENT DOCUMENTS

| | | |
|---|---|---|
| 514644 | 7/1955 | Canada . |
| 996535 | 9/1976 | Canada . |

OTHER PUBLICATIONS

Makarova et al., *Methods of Elemento-Organic Chemistry*, vol. 4 (1967), Pub. by North Holland Pub. Co., Amsterdam, pp. 57–141.

Majors, Journal of Chromatographic Science, vol. 15 (1977), pp. 334–357.

Majors, Journal of Chromatographic Science, vol. 12 (1974), pp. 767–778.

Larock, Angew. Chem., Int. Ed. Engl. 17, 27–37 (1978).

*Primary Examiner*—Patrick Garvin
*Attorney, Agent, or Firm*—Craig and Antonelli

[57] ABSTRACT

Organomercuric bonded phase sorbent materials useful for chromatographic separation of a wide variety of compounds are described. Their preparation involves reacting an organic compound chemically bonded to a solid support substrate with a mercury salt.

25 Claims, 6 Drawing Figures

MERCURO-ORGANIC BONDED PHASE SORBENTS

The present invention relates to bonded phase sorbent materials comprising organomercuric compounds immobilized on a solid support substrate and to their preparation.

Sorbents having organic compounds immobilized to a solid support have been known in the prior art. The known bonded phase sorbents, however, are limited to bonded hydrocarbons, as described in Canadian Pat. No. 514,644 and U.S. Pat. No. 2,722,504, bonded compounds with polar functional groups, such as disclosed in Canadian Pat. No. 996,535 and U.S. Pat. No. 3,664,967, and bonded compounds with ion exchange properties. The interactions of these sorbents with organic substrates are based on non-specific affinities, as in the case of bonded hydrocarbons, or on polarity or electrical charge of the substrate molecules, as in the case of bonded polar and ion exchange compounds. These bonded phase sorbents, however, lack or have limited affinity for the formation of complexes with organic species which is exhibited by a number of metals. Sorbents using these affinities such as metal ion loaded ion exchange resins, clathrates, organometallic complexes and metal salt impregnated supports have been tried in the past in various separation systems. Among these complexing metals mercury has been known to be outstanding and sorbents based on inorganic mercury have been prepared. Yet, they found only limited chromatographic application, because of difficulties in solute recoveries.

None of the known sorbents, however, makes use of the organomercuric cation $R-Hg^+$ which is capable of forming complexes with a wide variety of compounds without forming irreversible bonds. In contrast to inorganic mercury, organic mercury compounds form reversible complexes thus allowing easy recovery of any absorbed solutes.

It is, therefore, an object of the invention to provide sorbent materials which make use of the selective complexing affinities of organic mercury salts. It is a further object of the invention to provide thermally and chemically stable high performance liquid chromatography sorbent material. It is a further object of the invention to employ the organomercuric sorbent as stationary phase to achieve improved chromatographic separation of $\pi$-electron containing compounds and compounds with sulfur, nitrogen or oxygen donor ligands, such as, for example, mixtures of polycyclic hydrocarbons, heterocyclic compounds and biochemical substances.

It is one aspect of the invention to provide a sorbent material for chromatography which comprises a solid support substrate, an organic link and a mercury moiety, wherein the organic link is chemically bonded to the support substrate and to the mercury moiety. Preferred embodiments of the invention comprise:

(a) a solid support substrate consisting preferably of inorganic solid support particles, more preferably of silica or alumina and most preferably of silica; and (b) an organomercuric moiety consisting of a mercury moiety and an organic link;

(c) the organic link contains $\pi$-electrons is preferably selected from the group consisting of aromatic hydrocarbons, heterocyclic compounds and alkenes, and is more preferably an aromatic hydrocarbon such as phenyl; and (d) the mercury moiety being preferably selected from the group consisting of mercury salts of carboxylic acids, mercury sulfate, mercury perchlorate and mercury nitrate, and most preferably mercury acetate.

A more preferred embodiment of the invention is aryl mercury acetate bonded to silica and a most preferred embodiment is phenyl mercury acetate, the phenyl moiety of which is bonded to silica.

It is another aspect of the invention to provide a process for preparing the sorbent material which comprises reacting, in the presence of an acid, an organic compound which is chemically bonded to a solid support substrate with a mercurating agent. Preferably, the reaction is conducted in a medium selected from the group consisting of aqueous and organic solvents and mixtures thereof at a temperature in the range of from ambient temperature to 200° C. More preferably, the reaction is conducted in the presence of acetic acid in a medium selected from the group consisting of water, methanol, ethanol, propanol, water-alcohol mixtures, nitrobenzene, tetrahydrofuran, dioxane, and mixtures thereof. Most preferably, the reaction is conducted in nitrobenzene at a temperature of about 110° C. with mercury acetate as mercurating agent, whereby the reaction medium is acidic.

It is a further aspect of the invention to provide a method of chromatographic separation which comprises feeding to a stationary phase consisting of a organomercuric compound chemically bonded to a solid support substrate a mixture of at least two components capable of being selectively absorbed by said stationary phase, and selectively eluting the component of the mixture with a mobile phase selected from the group consisting of aqueous solvents, organic solvents and mixtures thereof. Preferably, the mixture capable of being selectively absorbed by the stationary phase is selected from the group consisting of aromatic hydrocarbons, heterocyclic compounds and compounds with sulfur, oxygen or nitrogen donor ligands.

Further objects and advantages of the invention will become apparent from the following description and claims.

The stationary phases for chromatography, according to the invention, comprise sorbent materials consisting of a solid support substrate chemically bonded to an organic compound which, in turn, is chemically bonded to a mercury salt.

Preparation of the sorbent materials, according to the invention, can be carried out by mercuration of organic compounds which are chemically bonded to the surface of solid support substrates. Suitable starting materials are silica or alumina bonded to organic compounds such as, for example, aromatic hydrocarbons, heterocyclic compounds or alkenes. Methods for preparation of these starting materials have been described previously.

In one method dried silica is reacted with a silane compound which carries as substituent the desired organic compound. For example, silica reacted with monochlorodimethylphenyl silane yields silanized silica with phenyl residues bonded to its surface. In another method silica or alumina is activated by halogenation. The organic compound is bromated, converted into the corresponding Grignard compound and reacted with the activated silica or alumina, respectively. For example, partially chlorinated silica reacted with naphthyl magnesium bromide yields silica with naphthyl residues bonded to its surface.

Mercuration of the organic compound bonded to a solid support substrate is effected by reacting the immobilized compound with a mercurating agent. The reaction can be carried out in an aqueous or organic reaction medium at a temperature in the range of from ambient temperature to about 200° C. The following is a schematic presentation of the reaction:

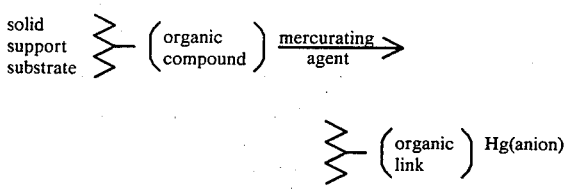

Examples of mercurating agents suitable for this reaction are mercury(II) compounds such as mercury acetate and mercury salts of other carboxylic acids, mercury oxide, mercury sulfate, mercury perchlorate and mercury nitrate. Examples of appropriate reaction media are water, alcohols such as methanol, ethanol and propanol, water-alcohol mixtures, esters, nitrobenzene, tetrahydrofuran, dioxane and mixtures thereof. Preferably, the reaction medium is rendered acidic. The resulting organomercuric bonded phase sorbent is purified with an aqueous or alcoholic acid solution. The presence of chemically bonded mercury atoms in the sorbent can be shown by elemental and X-ray fluorescence analysis.

The resulting organomercuric bonded phase sorbents, extend the range of application of bonded phase chromatography. The bonded organomercuric salt phase of these sorbents combines the complexing affinities of mercury with the partition and/or adsorption potential and ion exchange properties of the organic and the anionic moiety of the immobilized molecule. Consequently, the nature of both the organic and the anionic moiety may substantially affect the interactions between mercury and the compounds to be separated. By contrast, bonded phase sorbents available at the present time are limited to bonded hydrocarbons, and to bonded compounds with polar or ion exchange functional groups. Accordingly, none of these sorbents exhibits the complexing properties of mercury.

Mercury (II) inorganic salts exhibit complexing affinities for sulphur, oxygen, nitrogen, phosphorus, arsenic selenium, tellurium and antimony donor ligands. Mercury $Hg^{2+}$ or organomercuric cation $R-Hg^+$ can bind to a wide variety of organic molecules. The known interactions include such substances as amines, amino acids, thiols, sulphides, phosphates, proteins, purines, pyrimidines, nucleic acids, heterocyclics as well as $\pi$-electron and hydroxyl containing compounds.

The high reactivity of inorganic mercury compounds, often leading to irreversible interactions between mercury and various species, were objections to sorbents based on inorganic mercury interactions. The organomercuric bonded phase sorbents, according to the invention, overcome these disadvantages, in part, due to the fact that organic mercury compounds do not form complexes as readily. In addition, organo-mercuric salts exhibit remarkable chemical and thermal stabilities. Furthermore, organomercury compounds show lower chemical reactivity towards organic substrates than a majority of other organometallics.

The selectivity of the organomercuric bonded phase sorbents is centered on $\pi$-electron containing compounds and compounds with S, O or N donor ligands. The sorbents can be used in normal phase and reversed phase chromatography. Accordingly, non-polar as well as polar mobile phases can be applied. As a result, these bonded phase sorbents have a wide variety of different applications.

The sorbents, according to the invention, are particularly suitable for high performance liquid chromatography. High performance liquid chromatography columns packed with a organomercuric bonded phase sorbent are mainly used in the separation of aromatic hydrocarbons, such as polycyclic compounds, compounds with S, N or O donor ligands, such as heterocyclic compounds.

Organomercuric salts (RHgX) under the influence of some inorganic salts, halides, ammonia and ammonia-like substances may be symmetrized to organomercurials ($R_2Hg$), which easily cleave with acids. The possibilities of irreversible sorption and unstable retention properties, due to changes in type and/or concentration of bonded molecules, were taken into consideration. If these occur, they would be a major objection to the use of such sorbents. The presence of acetic acid during mercuration as well as washing of the mercurated sorbent, e.g. mercurated silicaphenyl, with hot 2 N acetic acid solutions suppressed the formation of diphenylmercurial groups, thereby providing a sorbent with homogeneous phenylmercuric acetate functionality. Since any kind of sorbent nonuniformity might adversely affect separation reproducibilies and prevent column regeneration, reproducibility of separations was monitored over a period of several weeks.

When aza-arenes, i.e. 4-azapyrene and 2-azafluoranthene were used as solutes the capacity factor values decreased with time when pure methanol was used as the eluant. It was assumed that the sorbent, after long contact with methanol, underwent symmetrization to diphenylmercurial compound due to the action of methanol itself, methanol impurities or retained aza-arene solutes. Subsequently it was found that the presence of acetic acid in the mobile phase resulted in reproducible retention volumes. To suppress possible changes in the nature of the sorbent, all polar phases included 0.5% acetic acid. Under these conditions, excellent reproducibilities were found. Irreversible sorption, which was a major disadvantage of other mercury based sorbents in the past has not been noticed. The columns were cleaned periodically using solutions of acetic acid in methanol or tetrahydrofuran.

Although the reversed phase mode may be successfully used, a majority of separations are achieved using normal phase eluants. A wide variety of nonpolar and polar mobile phase compositions can be used. For phenyl mercury acetate based column materials the elutropic series appears to be as follows: Hydrocarbons < water ≈ acetonitrile < alcohols ≈ ethyl acetate < tetrahydrofuran < dioxane < dimethylsulphoxide < formamide.

Acetic acid affected retention of the solutes subjected to protonation/deprotonation reactions. For example, with phenyl mercury acetate bonded phase sorbent the presence of acetic acid decreased carbazole and benzo (a) carbazole retentions and was accompanied by significantly narrower elution bands. This indicates that various sorption mechanisms can influence retention and elution. The above dependencies also indicate that pH control may be essential for some solute separations.

Otherwise, the observed strength of the eluant was determined by the chemical affinities of mobile phase components for mercury atoms. Solvent polarity was not a decisive factor for separations on the phenyl mercuric acetate bonded phase sorbent. Mobile phase strength was increased by employing a higher concentration of the complexing component, or by changing to a substantially stronger complexing agent. Retention of a solute on the stationary phase decreases as the chemical affinity of the mobile phase for mercury increases.

Sulphur, oxygen and nitrogen containing compounds and polynuclear aromatic hydrocarbons are strongly retained on columns of phenyl mercury acetate bonded to silica, when aliphatic hydrocarbons are used as mobile phases. The presence in the mobile phase of solvents containing oxygen atoms, such as dioxane, tetrahydrofuran or ethyl acetate, is necessary to elute most of these compounds. In general, peaks are sharper in nonpolar eluants, although elevated operating temperatures improve peak shapes in polar eluants. Separations in nonpolar eluants may be performed at ambient temperature.

In application to the chromatography of polycyclic aromatic hydrocarbons, it was noted that the elution sequence is based on the number of fused aromatic rings. This differentiates this sorbent from other bonded phase sorbents, the elution sequences of which are strongly influenced by substituents of the aromatic rings and the selectivities of which are limited to four aromatic rings. For bonded phenyl mercury acetate columns increased concentration of dioxane in aliphatic hydrocarbon based mobile phases was required for elution of more strongly retained PAHs. To achieve separation of PAHs up to 7 rings, eluant gradients were necessary.

In order to evaluate the effect of alkyl- and phenyl-substituents on PAH retention, an eluant containing 4% dioxane in hexane was used. The column was calibrated with a standard PAH mixture. The retention indices for substituted derivatives and parent PAHs were calculated from experimentally determined retention volumes. In most cases alkyl substituents did not affect retention relative to the parent ring system. Only in a small number of cases were minor changes in retention noted. Phenyl substitution led to retention differences, however, the retention index increment values corresponding to phenyl substitution are lower than those for other bonded phase sorbents such as reversed phase silica-$C_{18}$ and normal phase silica-R $(NH_2)_2$ systems. Insignificant contributions of alkyl- and phenyl-substitution to the parent PAH retention as well as selectivity based on the number of fused aromatic rings provide interesting possibilities for the analysis of hydrocarbon materials. Separations achieved on phenyl mercury acetate based columns are insensitive to the degree of alkyl-substitution on ring compounds and, therefore, capable of giving class separation. Class separation based on the number of fused aromatic rings permits more reliable analysis of aromatic ring types in various aromatic concentrates. In contrast to the alkyl-substituent selectivities obtained with reversed phase hydrocarbon bonded phase sorbents, the lack of alkyl-substituent selectivity and ability to use volatile forward phase systems permits interfacing the chromatographic system with a mass spectrometer for characterization of multicomponent mixtures in terms of alkyl-substitution of resolved compound types. The unique selectivity of this packing is particularly useful for the analysis of non-conventional fossil fuel and environmental samples abundant in PAHs. Separation and characterization of PAHs are of particular interest because of their role in various process streams as well as their potential carcinogenic and mutagenic properties.

Retention and elution properties of various S, O and N donor ligand compounds were studied using nonpolar eluants. The presence of sulphur, oxygen and nitrogen functionalities, either substituted aromatics or heterocyclics, resulted in stronger retentions compared to equivalent hydrocarbon structures. The selectivities observed can, for example, be used to separate quinones and sulphur compounds in the presence of equivalent aromatics. The majority of N-heterocyclics and other nitrogen containing compounds were too strongly retained on the column to elute with hydrocarbon based mobile phases. These compounds were, however, easily removed from the column with polar eluants. Many of these separations could not be achieved with comparable efficiency, selectivity and resolution with previously known bonded sorbents. Compounds such as aromatic hydrocarbons and compounds with built-in or attached S, O or N donor ligands constitute a significant portion of energy, environmental and biologically significant compounds. Consequently a sorbent showing unusual selectivities toward these compounds is potentially useful in all such areas of applications as a complement to existing normal and reversed phase systems. As indicated by the complexing affinities of $Hg^{2+}$ and R—$Hg^+$ compounds with phosphorus, arsenic, selenium, tellurium and antimony donor ligands as well as other neutral and charged solute species, including many biochemical substances, are likely to interact selectively with sorbents according to the invention.

EXAMPLE 1

Preparation of phenyl mercury acetate chemically bonded to silica

Preparation of silica-phenyl 5 g of silica (LiChrosorb Si 60, 10 μm) was heated at 110° C. for 14 hours to remove surface water. The hot silica was then transferred to a flask containing dry nitrogen purged toluene (dried with molecular sieves). A dry solution of trichlorophenyl silane (0.5 mmol in 3 ml pyridine) was added and the mixture was refluxed while stirring for 6 hours. The solid material was filtered off and the sorbent washed with toluene, methanol, acetone, methanol-water (1:1) and acetone, and finally dried at 110° C. for 1 hour. For the preliminary studies of bonding procedures silica portions of 1 g were used. Solid samples were taken for C-H analysis. Results of the microanalysis (2.09%C, 0.24%H) of the material used in the mercuration reaction indicated that the approximate concentration of phenyl groups was $2.9 \times 10^{-4}$ mol $g^{-1}$ of dry material.

Preparation of sorbent

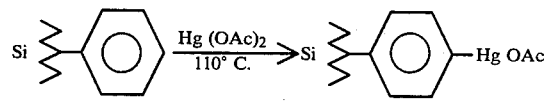

3 g of mercury acetate was gradually added as a powder over a 2 hour period to 5 g of stirred silica-phenyl suspended in 50 ml of nitrobenzene containing 3 ml acetic acid. The reaction mixture was heated at 110° C. for 6 hours. The sorbent was filtered off, purified by washing successively with hot nitrobenzene, methanol, hot aqueous acetic acid (2 N) and finally with 10% acetic acid in methanol before being dried in vacuo at 60° C. A relative degree of the phenyl conversion was monitored by X-ray fluorescence analyzer (Ortec, Oak Ridge, Tennessee) to maximum bonded Hg loadings. The results of C-H microanalysis indicated an approximate degree of conversion of 96–100% for the column material used in the following Examples.

EXAMPLE 2

High performance liquid chromatography (HPLC) of polycyclic aromatic hydrocarbons (PAHs)

A Spectra-Physics (Santa Clara, California) Model 3500 Liquid Chromatograph with two pumps, solvent programmer, UV detector and a valve loop injector with a 10 μl loop was used. Columns (4.6×200 mm) were slurry packed using heptane. Hexane and methanol solutions of PAHs were prepared for use in nonpolar and polar mobile phases respectively. All polar phases included 0.5% acetic acid. The concentrations of the individual components in the mixtures injected were about $1 \times 10^{-4}$–$5 \times 10^{-3}$ M. Mobile phases were pumped at a flow rate of 2 ml/min.

Separation of the PAHs was performed using columns at ambient temperature. The resulting elution profiles are shown in FIG. 1. The various mobile phases used were:
A. Mobile Phase: 1,4-Dioxane/n-Hexane (1:99)
B. Mobile Phase: 1,4-Dioxane/n-Hexane (8:92)
C. Mobile Phase: 1,4-Dioxane/n-Hexane (25:75)
D. Mobile Phase: 1,4-Dioxane/n-Hexane (50:50)
The peaks in the four chromatograms depict the following compounds:
1. Benzene
2. Indene
3. Naphthalene, biphenyl
4. Azulene, acenaphthene
5. α-terphenyl, biphenylene
6. 1,1′-dinaphthyl
7. p-terphenyl, fluorene
8. m-terphenyl
9. 9-phenylanthracene
10. Anthracene
11. Phenanthrene
12. 2,2′-dinaphthyl, benzo (b) fluorene
13. Benzo (c) fluorene, fluoranthene, benzo (a) fluorene
14. Pyrene
15. Difluorenyl
16. Benz (a) anthracene, chrysene
17. Triphenylene, benzo (k) fluoranthene
18. Benzo (a) pyrene, pentacene, picene, benzo (b) fluoranthene, dibenz (a, h) anthracene
19. Dibenzo (a,c) anthracene
20. Perylene, indeno (1,2,3-c,d) pyrene
21. Dibenzo (e, h) pyrene, dibenzo (a, h) pyrene
22. Anthanthrene
23. Rubicene
24. Benzo (g, h, i) perylene
25. 11,12-phenyleneperylene
26. Coronene

EXAMPLE 3

Separation of PAHs based on the number of fused aromatic rings

Figure 2:
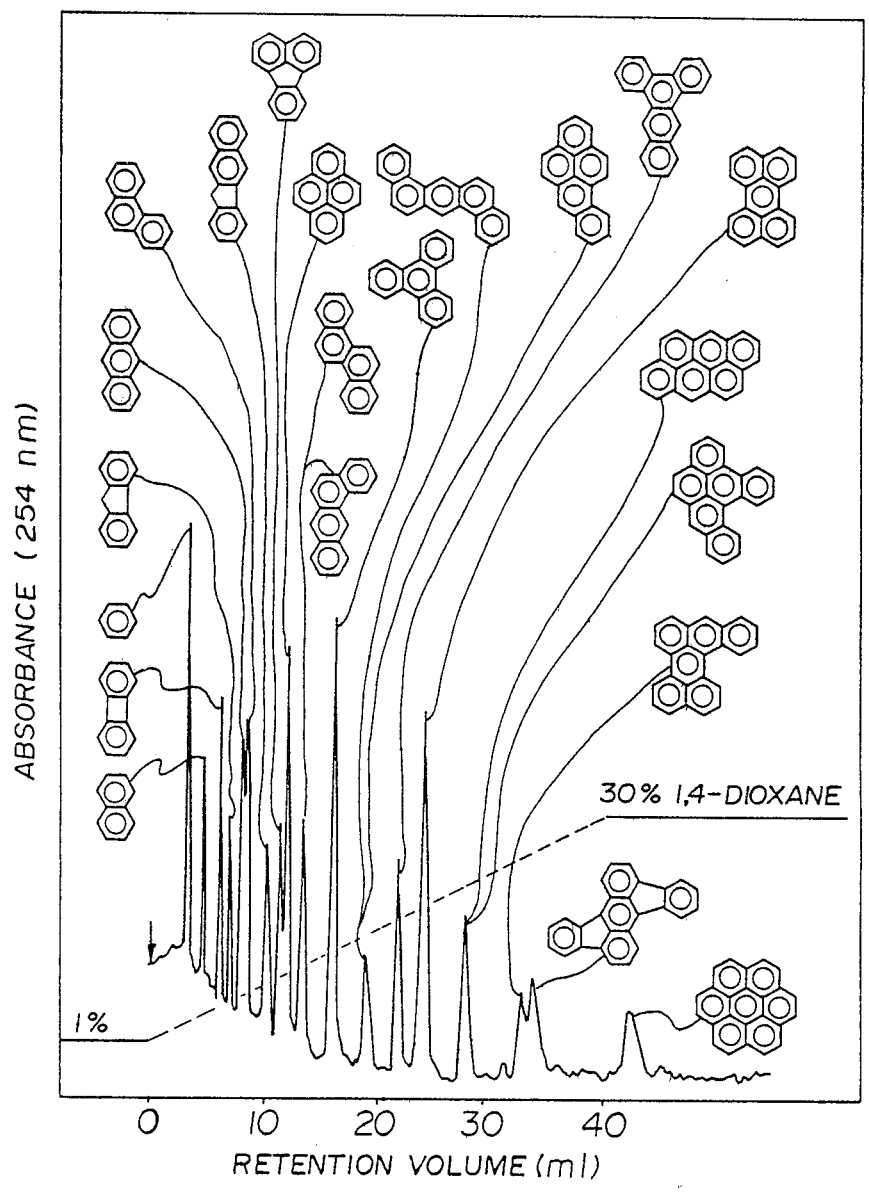

Conditions for this separation were the same as in Example 2 except that as mobile phase the following gradient was used: 1,4-dioxane/n-hexane 1:99 to 30:70 in 20 minutes. The resulting elution profile is shown in FIG. 2.

EXAMPLE 4

Figure 3:
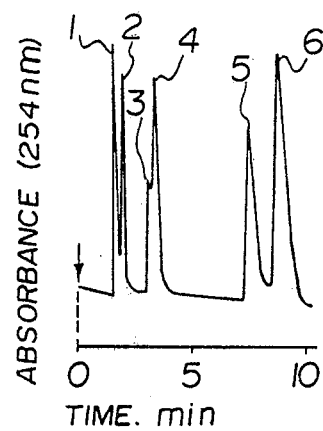

Separation of a standard mixture of PAHs used for evaluation of the effect of alkyl-and phenyl-substitution on the retention of parent PAHs Conditions for this separation were the same as in Example 2 except that the mobile phase used was 4% 1,3-dioxane in n-hexane. The resulting elution profile is shown in FIG. 3. The peaks depict the following compounds:
1. Benzene
2. Naphthalene
3. Anthracene
4. Phenanthrene
5. Pyrene
6. Benz (a) anthracene

EXAMPLE 5

Separations of S, O and N donor ligands and PAHs

Figure 4:
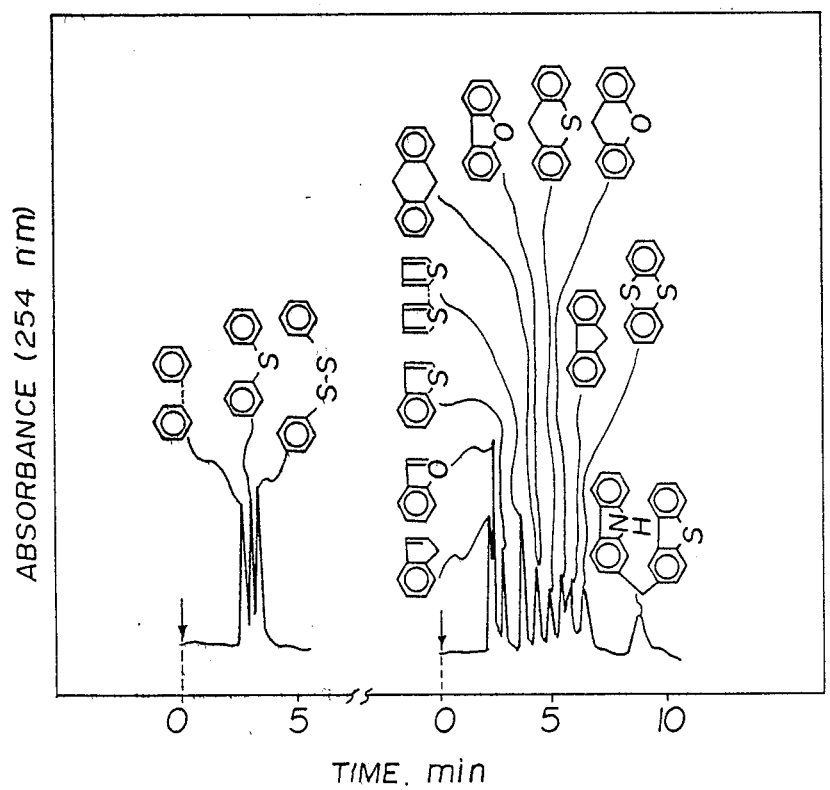

Conditions for these separations were the same as in Example 2 except that the mobile phase used was 1% 1,4-dioxane in n-hexane. The resulting elution profiles are shown in FIG. 4.

EXAMPLE 6

Separation of quinones and equivalent parent PAHs

Figure 5:
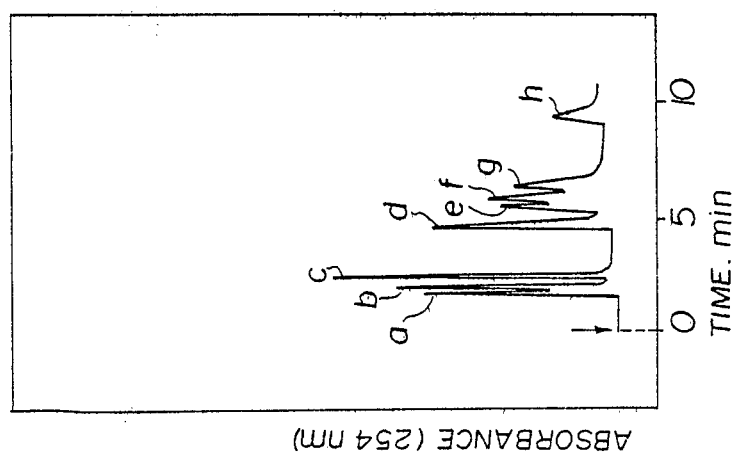

Conditions for these separations were the same as in Example 2 except that the mobile phase used was 6% 1,4dioxane in n-hexane. The resulting elution profile is shown in FIG. 5. The peaks depict the following compounds:

| Peaks: | a. Naphthalene |
|---|---|
| | b. 9,10-Dihydroanthracene |
| | c. Anthracene |
| | d. Naphthoquinone |
| | e. Benz (a) anthracene |
| | f. Anthraquinone |
| | g. Anthrone |
| | h. Benz (a) anthracene-7,12-dione |

EXAMPLE 7

Separations for aza-arenes

Figure 6:
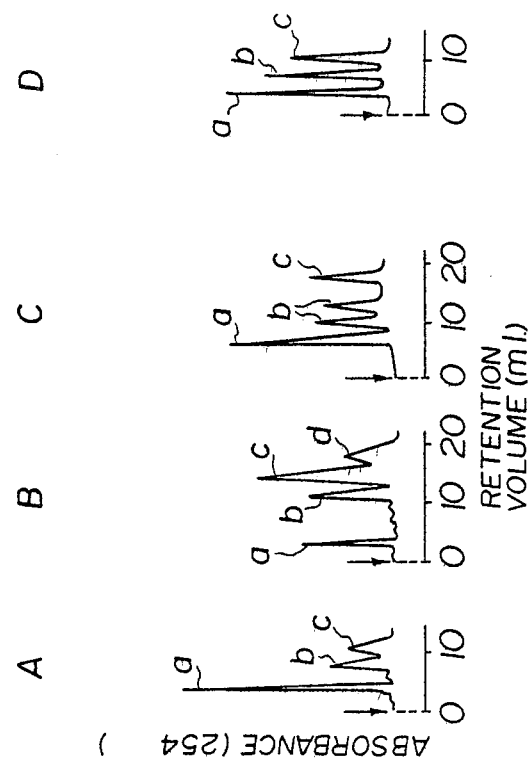

Conditions for these separations were the same as in Example 2 except that temperature of the column was 50° C. The elution profiles are shown in FIG. 6. The mobile phases used and the compounds separated were as follows:

| A. Mobile phase: | Acetic Acid/Water/Methanol (0.5:50:49.5) |
|---|---|
| Peaks: a: | Benzo (h) quinoline |
| b: | Carbazole |
| c: | Benz (c) acridine |
| B. Mobile Phase: | Acetic Acid/Methanol (0.5:99.5) |
| Peaks: a: | Benzo (a) carbazole |
| b: | Acridine |
| c: | 4-Azafluorene |
| d: | 13-Azafluoranthene |
| C. Mobile Phase: | Acetic Acid/Tetrahydrofuran/Methanol (0.5:60:39.5) |
| Peaks: a: | 2-Azafluoranthene |
| b: | 4-Azapyrene |
| c: | Benzo (f) quinoline |
| d: | Quinoline |

-continued

D. Mobile Phase: 2.5 × 10⁻² M Formamide in Acetic Acid/
Peaks: Methanol (0.5:99.5)
Peaks: a: 9,10-Diazaphenanthrene
b: 1,5-Diazaphenanthrene
c: 4,7-Diazaphenanthrene

EXAMPLE 8

Retention indices for substituted derivatives and parent PAHs were calculated from the experimentally determined retension volumes as described in Popl M.; Dolansky V.; Mostecky, J. J.; Chromatogr., 1976, 117, 117–127. The results are listed in Table 1.

TABLE 1

Retention indices of polycyclic aromatic hydrocarbons (PAH) and increments in retention indices due to PAH alkyl- and phenyl-substitution.

| HYDROCARBON | Log I | Δ Log I for Alkyl | Δ Log I for Phenyl |
|---|---|---|---|
| Benzene | 1.000 | | |
| Biphenyl | 2.000 | | 1.000 |
| o-Terphenyl | 2.523 | | 1.523 |
| m-Terphenyl | 2.704 | | 1.704 |
| p-Terphenyl | 2.463 | | 1.463 |
| 1,3,5-Triphenylbenzene | 3.142 | | 2.142 |
| Naphthalene | 2.000 | | |
| 2-Methylnaphthalene | 2.000 | 0.000 | |
| 2-Ethylnaphthalene | 2.000 | 0.000 | |
| 1,2-Dimethylnaphthalene | 2.220 | 0.220 | |
| 1,4-Dimethylnaphthalene | 2.000 | 0.000 | |
| 1,6-Dimethylnaphthalene | 2.000 | 0.000 | |
| 2,6-Dimethylnaphthalene | 2.000 | 0.000 | |
| 2,7-Dimethylnaphthalene | 2.000 | 0.000 | |
| 1,3,7-Trimethyl-naphthalene | 2.000 | 0.000 | |
| Acenaphthene | 2.161 | 0.161 | |
| 1-Phenylnaphthalene | 2.348 | | 0.348 |
| 2-Phenylnaphthalene | 2.890 | | 0.890 |
| 1,2,3,4-Tetraphenyl-naphthalene | 2.890 | | 0.890 |
| Anthracene | 2.890 | | |
| 2-Methylanthracene | 3.139 | 0.249 | |
| 9-Methylanthracene | 3.190 | 0.300 | |
| 2-Phenylanthracene | 3.190 | | 0.300 |
| 9-Phenylanthracene | 2.890 | | 0.000 |
| 9,10-Diphenylanthracene | 2.780 | | −0.110 |
| Phenanthrene | 3.000 | | |
| 3-Methylphenanthrene | 3.073 | 0.073 | |
| 3,6-Dimethylphenanthrene | 3.092 | 0.092 | |
| Pyrene | 3.841 | | |
| 1-Methylpyrene | 3.848 | 0.007 | |
| 3-Methylpyrene | 3.898 | 0.050 | |
| 4-Methylpyrene | 3.940 | 0.099 | |
| Benz(a)anthracene | 4.000 | | |
| 7,12-Dimethylbenz(a)-anthracene | 3.772 | −0.228 | |

The embodiments of the invention in which an exclusive property or privilege is claimed are defined as follows:

1. A sorbent material for chromatography comprising an organomercuric moiety chemically bonded to a solid support substrate, wherein said organomercuric moiety comprises an organic link and a mercury moiety, wherein the organic link is chemically bonded to the support substrate and to the mercury moiety, said organic link being an aromatic hydrocarbon.

2. A sorbent material as in claim 1, wherein the solid support substrate consists of inorganic solid support particles.

3. A sorbent material for chromatography comprising inorganic solid support particles chemically bonded to an organic link selected from the group consisting of aromatic hydrocarbons, and wherein a mercury salt is chemically bonded to said organic link, said mercury salt being selected from the group consisting of mercury salts of carboxylic acids.

4. A sorbent material as in claim 3 wherein the inorganic solid support particles are selected from the group consisting of silica and alumina.

5. A sorbent material as in claim 1 wherein the mercury moiety is selected from the group consisting of mercury salts of carboxylic acids, mercury sulphate, mercury perchlorate, and mercury nitrate.

6. A sorbent material as in claim 2, 3 or 4 wherein the inorganic solid support particles are silica.

7. A sorbent material as in claim 3, wherein said organic link is phenyl.

8. A sorbent material as in claim 3 or 4 wherein the mercury salt is mercury acetate.

9. A sorbent material for chromatography comprising silica chemically bonded to an aromatic hydrocarbon wherein mercury acetate is chemically bonded to said aromatic hydrocarbon compound.

10. A sorbent material for chromatography comprising silica chemically bonded to the phenyl moiety of phenyl mercury acetate.

11. A process for preparing sorbent material for chromatography which comprises reacting, at a temperature in the range of from ambient temperature to about 200° C. in the presence of an acid, an aromatic hydrocarbon which is chemically bonded to a solid support substrate with a mercurating agent, to form a bond between the aromatic hydrocarbon and the mercurating agent.

12. A method as in claim 11 conducted in a reaction medium selected from the group consisting of aqueous and organic solvents and mixtures thereof.

13. A method as in claim 11 wherein the solid support substrate consists of inorganic solid support particles.

14. A method as in claim 11 or 13 wherein the solid support substrate is selected from the group consisting of silica and alumina.

15. A method as in claim 11 wherein the mercurating agent is selected from the group consisting of mercury salts of carboxylic acids, mercury oxide, mercury sulfate, mercury perchlorate, and mercury nitrate.

16. A method as in claim 11 conducted in a reaction medium selected from the group consisting of water, methanol, ethanol, propanol, water-alcohol mixtures, esters, nitrobenzene, tetrahydrofuran, dioxane, and mixtures thereof.

17. A method as in claim 11 or 13, wherein the solid support substrate is silica.

18. A method as in claim 11 or 15, wherein the mercurating agent is mercury acetate.

19. A method as in claim 11 or 16, using a nitrobenzene as reaction medium.

20. A method as in claim 11 wherein the reaction is conducted at about 110° C.

21. A method for preparing sorbent material for chromatography which comprises reacting at about 110° C. an aromatic hydrocarbon which is chemically bonded to silica with mercury acetate in the presence of acetic acid and using nitrobenzene as reaction medium to form a sorbent material wherein the aromatic hydrocarbon is chemically bonded to silica and to mercury acetate.

22. A method as in claim 21 wherein the aromatic hydrocarbon is phenyl.

23. A method as in claim 18, wherein the acid is acetic acid.

24. A method for preparing sorbent material for chromatography comprising reacting, at about 110° C. and in the presence of acetic acid, about 5 parts by weight of silica-phenyl with about 3 parts by weight of mercury acetate using nitrobenzene as the reaction medium to form phenyl mercury acetate, the phenyl moiety of which is chemically bonded to silica.

25. A method as in claim 24, wherein the reaction time is about 6 hours.

* * * * *